United States Patent

[11] 3,558,142

[72] Inventor Hans Poessel
Kloten, Switzerland
[21] Appl. No. 743,062
[22] Filed July 8, 1968
[45] Patented Jan. 26, 1971
[73] Assignee Eduard Ritter
Zurich, Switzerland
[32] Priority July 19, 1967
[33] Switzerland
[31] 10277/67

[54] RECORDING TAPE MAGAZINE
1 Claim, 6 Drawing Figs.

[52] U.S. Cl. ........................................................ 274/4, 242/199, 242/76, 40/28.1, 35/35, 274/43
[51] Int. Cl. ........................................................ G11b 5/00
[50] Field of Search ............................................ 274/4, 42P, 11, 43; 242/55.19A; 179/100.2S, 100.2Z; 346/136; 226/N.A.; 40/N.A.; 35/35.3; 353/19

[56] References Cited

UNITED STATES PATENTS

| | | | |
|---|---|---|---|
| 3,321,208 | 5/1967 | Nicholson | 274/42 |
| 3,255,537 | 6/1966 | Cole et al. | 274/43 |
| 3,230,825 | 1/1966 | Knight | 33/35.3 |
| 3,176,927 | 4/1965 | Irazoqui | 35/35.3 |
| 2,950,543 | 8/1960 | Ritter et al. | 35/35.3 |
| 2,937,818 | 5/1960 | Zorn | 242/199 |

*Primary Examiner*—Leonard Forman
*Assistant Examiner*—Dennis A. Dearing
*Attorney*—Jacobi & Davidson

ABSTRACT: There is disclosed a magazine for recording tape which is of the type comprising a magazine housing and a windoff spool and windup spool disposed in such magazine housing. A recording tape is guided along a predetermined path of travel between the windoff spool and the windup spool. The magazine housing incorporates means defining a viewing area along the path of travel for the recording tape in order to render visible visual markings provided on the recording tape in synchronism with the reproduction or playback of acoustical information on the recording tape.

PATENTED JAN 26 1971

3,558,142

INVENTOR

HANS PÖSSL

BY Jacobi & Davidson

ATTORNEYS

RECORDING TAPE MAGAZINE

BACKGROUND OF THE INVENTION

The present invention relates to an improved magazine or cartridge for recording tapes of the type incorporating a recording tape which is guided between a windoff spool and a windup spool.

With the known recording tape magazines which are available on the market, it is difficult to locate a certain place along the length of the tape, for instance the start of a musical number or arrangement. In any case, the conventional visual scales or marks which relate to the diameter of the wound tape and provided at one of the tape spools, are much too inaccurate for this purpose in that, at best, they only provide a rough indication of the division of the tape. If a desired location or place on the magnetic tape is attempted to be found during the fast forward or rewind of the tape, then it is necessary to also listen to the disturbing and noninformative noises, typically in the form of the usually encountered "squeaks " and the subsequent listening to the tape, which is still required while running at normal speed until the desired location appears, is quite time-consuming. Generally, it has been found to be a drawback of recording tapes that they themselves do not provide any indication or clue about the acoustical information which is stored on the tape and that certain desired portions of this information can only be located and obtained by listening to the tape as it is played back on the sound reproduction device.

SUMMARY OF THE INVENTION

Accordingly, it is a primary object of the present invention to effectively overcome these drawbacks of the prior art constructions.

Another, more specific object of the present invention relates to an improved magazine for recording tape which enables the location of desired portions of the tape to be determined quickly and with a minimum amount of effort and time.

. Still a further very specific object of the present invention relates to an improved magazine for recording tapes upon which there is stored both visual and acoustical information, and wherein the magazine is constructed in such a manner that a viewing area is provided along the path of travel of the recording tape which renders visible the visual markings in synchronism with the playback of the acoustical information on the tape.

A further noteworthy object of the present invention relates to an improved magazine for magnetic tapes which serves to contain the tape in a manner where it can be easily mounted upon a tape recorder for normal usage, the magazine being of relatively simple construction, serves to protect the tape against damage, and can be used quite effectively with tapes having stored thereon both visual and acoustical information.

Now, in order to implement these and still further objects of the invention, which will become more readily apparent as the description proceeds, the inventive recording tape magazine is manifested by the features that the magazine housing is equipped with a viewing area arranged along the path of travel of the tape in order to render visible visual markings provided on the tape in synchronism with the reproduction or playback of associated acoustical information on the tape.

A magnetic tape is already known to the art which has impressed or printed thereon a text or information in accordance with a text-soundtrack. Such printed recording tapes are wound upon conventional reels and not contained in magazine or cartridges. To play back these tapes a tape recorder is required which is equipped with a special optical read-out device past which the recording tape must be guided during playback in order that the text or visual information can be read. This requires an additional expenditure in equipment and further space at the tape recorder. Additionally, the threading of the tape, which already creates difficulties for the less skilled user, becomes further complicated. Accordingly, the playback of the tape can only be performed with a certain type of special equipment which contains the aforementioned additional components to complete this end, and, of course, assuming that such devices are even available on the market.

The invention will be described hereinafter with regard to standard or conventional magnetic recording tapes having stored thereon acoustical information, such as speech or music.

DESCRIPTION OF THE DRAWING

The invention will be better understood, and objects other than those set forth above, will become apparent, when consideration is given to the following detailed description thereof. Such description makes reference to the annexed drawing herein.

DESCRIPTION OF THE PREFERRED EMBODIMENTS

Figure 1:
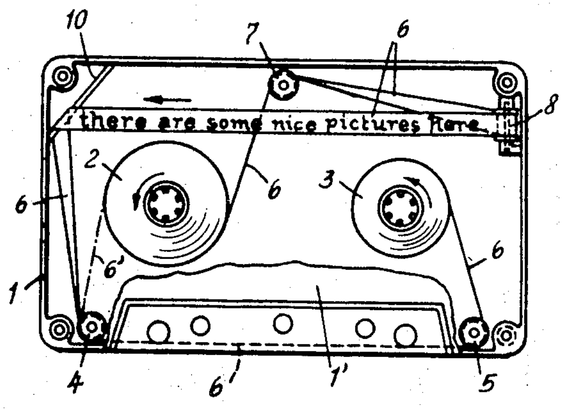
FIG. 1 illustrates a recording tape magazine designed according to the teachings of the present invention and wherein the cover of the magazine housing has, for the most part, been omitted in order to render visible the inside of the magazine and the course of travel of the tape.
Figure 2:
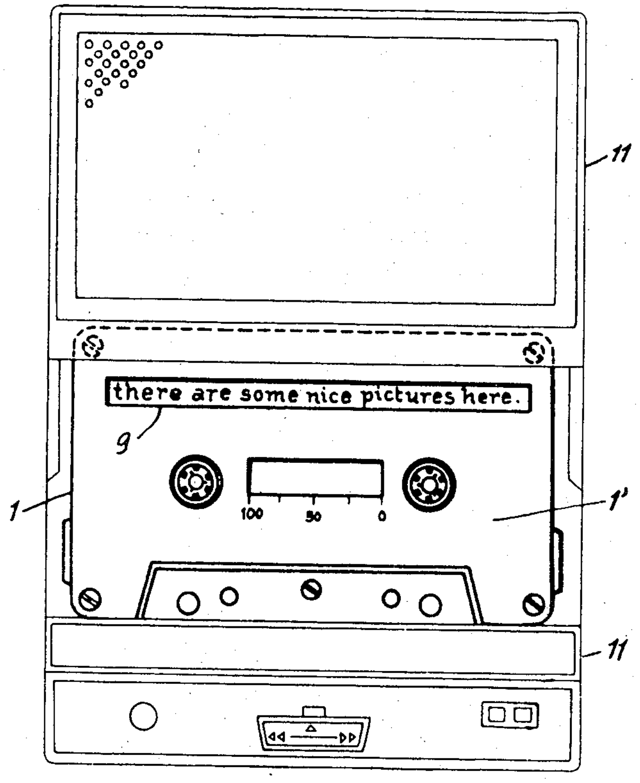
FIG. 2 schematically illustrates a magazine loaded tape recorder with an inserted, closed magazine of the type shown in FIG. 1.

Describing now the drawing, and in particular, referring to FIGS. 1 and 2, it will be recognized that the housing 1 of the recording tape magazine or cartridge, shown in FIG. 1, contains a windoff spool 2 and a windup spool 3 as well as the recording tape 6. In FIG. 1, a the housing cover member 1' which forms a flat side portion or wall of the housing 1 and which faces the user of the magazine when it is in its normal position of use, is only partially shown in such FIG. in order to expose the aforementioned spools 2 and 3 and the path of travel of the magnetic tape 6. With a conventional recording tape magazine of this type, the magnetic tape 6 travels from the windoff spool 2, in the manner generally shown in chain-dot or phantom lines 6' directly to a deflecting or guide roller 4, then along the lower narrow side portion of the housing 1 to the usual recording head, playback or reproduction head, and the erasing head (not shown) of the tape recorder. Then the tape 6 travels past a further deflecting roller 5 and from this location to the windup spool 3.

However, in the case of the exemplary illustrated embodiment of inventive tape magazine, the magnetic tape 6 is guided between the windoff spool 2 and the deflecting roller 4 over additional deflecting elements contained in the magazine. More precisely, it will be recognized that the tape 6 travels from the spool 2 past a deflecting roller 7 which is mounted to be freely rotatable in the magazine, then over a further rotatable deflecting roller 8 which is mounted at the right-hand portion of the magazine of FIG. 1 with a substantially horizontal axis. Thereafter, the tape 6 moves towards the left transversely through the magazine and is guided about a guide rod 10 which is secured in the upper left-hand corner of the magazine at an angle of about 45°, and from this location the tape passes to the deflecting roller 4 and then finally via the roller 5 to the windup spool 3. Between the deflecting roller 8 and the deflecting or guide rod 10 the band 6 is disposed in a plane which is in parallelism with the housing cover member 1' and is directly beneath such cover member and, furthermore, travels from the right towards the left of the magazine, in other words in a direction opposite to the normal direction of reading of the visual information or text printed or otherwise impressed upon the tape. Furthermore, the relevant section of the tape is visible by virtue of the provision of the viewing area or window 9 (FIG. 2) which is provided at the cover member 1''.

In the present exemplary embodiment, the recording tape 6 is equipped, for the purpose of teaching a language, by way of example, in the following manner: at least at certain portions of the tape there is recorded on the tape by the teacher a foreign language text or information (between the recorded acoustical information there can be provided clean band portions or sections which are reserved for the student so that he can record material in order to control or check his learning progress). In addition to the acoustical recording of the learning text, the recording tape is also provided with the corresponding text in visual form for visual playback; in addition to the foreign language text, there can also be provided in printed form the translation thereof. The acoustical and the visual recording of the corresponding text or information locations are advantageously displaced with respect to one another along the length of the recording tape 6 by a certain amount, so that during the reproduction at the tape recorder device 11 the acoustical information or words heard by the student and passing past the reproducing head can be synchronously read in the viewing area or region 9. In so doing, it is additionally advantageous to construct the viewing area 9 of sufficient length so that at the same time a number of words of the written text can be viewed.

Since the student positively synchronously receives the acoustical and the visual information stored on the tape, it is possible to achieve exceptional success with the learning process. With standard teaching techniques using tape recorders, the written text or information is, for instance, presented in the form of a book. Experience has shown that considerable concentration is required to always be able to read the proper text along in the book or during repetition to again find such text or written material in the book. However, with the inventive arrangement, it is possible for the student at the beginning of his exercise to easily locate any optional portion of the tape even when the acoustical playback is still switched off, without being distracted by the undesired noises which occur during quick tape travel. Also, the student is not distracted during reading out of the visual information by other text material at different locations.

The tape speed which should be used, on the one hand, should naturally provide for a sufficient quality of the acoustical playback, on the other hand, however, should not be too large so that the text can be read without great effort, which again depends upon the size of the written information. Since for the playback of the sound a relatively low tape speed is completely sufficient, and furthermore, favorable conditions exist for reading inasmuch as the direction of viewing of the person automatically concentrates on the viewing area or zone, it is possible to readily find a suitable compromise value for the speed of the tape. For instance, a tape speed in the order of magnitude of about 3 to 3.5 centimeters per second, has been found to be quite satisfactory.

The present described inventive magazine arrangement for recording tapes can be used to great advantage for many other instructional purposes apart from the teaching of languages, for instance for self-teaching. As is well recognized, the understanding of certain material or facts and the retention by the memory is considerably improved if the information is simultaneously impressed upon the party learning both visually as well as acoustically. This fact is extensively utilized by means of the present inventive arrangement in that, quite different than during reading from a printed page, here always only the immediately required text material or location is transmitted exactly in synchronism with the acoustical playback.

Furthermore, apart from the exemplary illustrated embodiment of recording tape magazine, it would naturally be possible to provide a number of different modifications or constructional variations thereof. Thus, for instance, it is possible to provide the viewing opening or window 9 at a narrow side of the magazine, either with a suitable direct line of sight with a different position of use of the device, or by deflecting the direction of sight or viewing, for instance, by means of a 45° mirror or the like which can be arranged at the inside of the magazine or also at the device itself. In so doing, under certain circumstances, it will be possible to dispense with the use of additional deflecting and guide means for the tape within the magazine. Furthermore, the magazine cover member is preferably tiltable; then the mounting of the spools can be constructed advantageously in such a way that standard tape spools can be used, so that tape recorders which do not come equipped with any magazine can also be used as magazine loaded tape recorder devices. The spool shafts of the magazine can be constructed in such a way that they can fit upon the drive pins or journals of a number of different tape recorder devices which are available on the commercial market.

Figure 3:
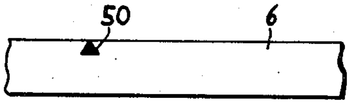
FIG. 3 is a fragmentary view of a portion of the recording tape provided with colored marking means.
Figure 4:
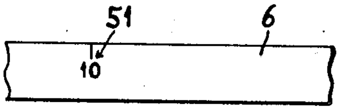
FIG. 4 is a fragmentary view of a portion of the recording tape provided with numerical marking means.
Figure 5:
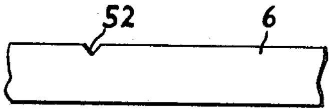
FIG. 5 is a fragmentary view of a portion of the recording tape provided with notch means.
Figure 6:
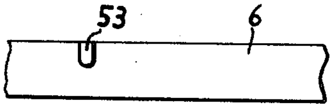
FIG. 6 is a fragmentary view of a portion of the recording tape provided with embossment means.

The use of visual markings at the recording tapes can be employed to advantage also in other situations than in conjunction with language texts. For instance, a recorded tape which contains a number of musical arrangements can be provided with a visual marker at the beginning of each musical arrangement. Each such visual marking can be constructed in the form of a colored marking, a numbered marking, yet also a visible mechanical change in a form such as notches, embossments or the like. Thus, for instance, in FIG. 3 there is shown a tape 6 which is provided with a colored marking 50, in FIG. 4 a tape provided with a numerical marking 51, here shown in the form of the numeral 10, in FIG. 5 a tape with a mechanical marking in the form of a notch 52, and finally, in FIG. 6 a tape with a mechanical marking in the form of a suitable embossment 53. Even during fast travel of the tape, these markings can be easily visually recognized, without requiring the acoustical playback, so that it is possible to quickly and easily locate a desired predetermined portion or location of the tape.

The application of the visual markings to the tape can take place in a number of different ways. For instance, recording tapes can be used which have a light sensitive emulsion to which there can be applied a written text by means of a suitable photographic copying technique. Furthermore, nonphotographic copying techniques can likewise be successfully employed. Additionally, the marking of the tapes by means of a suitably constructed typewriter or by means of a suitable teleprinter or teletype machine should also be mentioned, and this equipment can, in known manner, be controlled automatically and repetitively, for instance, by means of punched tape or the like. In the case of recording tapes provided with language texts, it is generally advantageous to initially provide the tape with the written text and then thereafter to store on the tape the acoustical information, since during passage of the tape through a tape recorder, the text can be read and synchronously spoken onto the tape.

A particular advantage of the invention resides in the fact that no additional devices or measures are required at the playback device. The playing back or the insertion of the tape at the device is just as simple as with normal magazines or cartridges since all of the requirements for the visual playback are already provided for at the magazine.

It should be apparent from the foregoing detailed description, that the objects set forth at the outset to the specification have been successfully achieved.

I claim:

1. A magazine for recording tape adapted to be used in conjunction with a tape recorder or the like, said magazine comprising: a magazine housing having at least one flat side portion which faces the user when the magazine is in its normal position of use; a windoff spool and a windup spool disposed in said magazine housing; a recording tape guided for continuous movement along a predetermined path of travel between said windoff spool and said windup spool; tape deflecting members provided in said magazine for detouring the recording tape along its path of travel from a first position for audio playback into a second position for visual read-out; means defining a viewing area provided at said flat side portion of said magazine housing and arranged along the detoured portion of the path of travel of the recording tape for rendering visible visual markings provided on the recording tape when in said second position and in synchronism with the reproduction of associated acoustical information on the recording tape; and wherein said tape deflecting members are disposed in said magazine housing such that the recording tape during sound reproduction moves through the viewing area in a direction opposite to the direction of reading of the visual markings.